(12) United States Patent
Dong (10) Patent No.: US 10,728,323 B2
(45) Date of Patent: Jul. 28, 2020

(54) METHOD AND APPARATUS FOR OPERATING INFRASTRUCTURE LAYER IN CLOUD COMPUTING ARCHITECTURE

(71) Applicant: BEIJING BAIDU NETCOM SCIENCE AND TECHNOLOGY CO., LTD., Beijing (CN)

(72) Inventor: Heng Dong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 306 days.

(21) Appl. No.: 15/429,097

(22) Filed: Feb. 9, 2017

(65) Prior Publication Data
US 2018/0063242 A1 Mar. 1, 2018

(30) Foreign Application Priority Data
Aug. 26, 2016 (CN) .......................... 2016 1 0739045

(51) Int. Cl.
*H04L 29/08* (2006.01)
*G06F 9/455* (2018.01)
*G06F 8/65* (2018.01)
*G06F 16/27* (2019.01)
*G06F 11/14* (2006.01)

(52) U.S. Cl.
CPC ............ *H04L 67/1095* (2013.01); *G06F 8/65* (2013.01); *G06F 9/45558* (2013.01); *G06F 11/1402* (2013.01); *G06F 16/27* (2019.01); *H04L 67/02* (2013.01); *G06F 2009/45579* (2013.01); *G06F 2201/80* (2013.01); *G06F 2201/805* (2013.01); *G06F 2201/81* (2013.01)

(58) Field of Classification Search
USPC ........................................................ 709/223
See application file for complete search history.

(56) References Cited

U.S. PATENT DOCUMENTS

| | | | |
|---|---|---|---|
| 8,655,307 B1 * | 2/2014 | Walker | H04W 52/0212 455/405 |
| 2009/0287726 A1 * | 11/2009 | Verhoeven | G06F 16/275 |
| 2013/0080480 A1 * | 3/2013 | Mao | H04L 41/5009 707/803 |

(Continued)

*Primary Examiner* — Umar Cheema
*Assistant Examiner* — Tony Williams
(74) *Attorney, Agent, or Firm* — Marshall, Gerstein & Borun LLP (57) ABSTRACT

The present disclosure provides a method and apparatus for operating an infrastructure layer of cloud computing architecture. A specific implementation of the method comprises: determining, in response to receiving an operation request sent by a user via a user terminal for the infrastructure layer, whether to execute an operation indicated by the operation request; sending, in response to determining to execute the operation, the operation request to the infrastructure layer; updating, after the infrastructure layer successfully executing the operation and updating the resources related to the infrastructure layer, a state of the resources related to the infrastructure layer stored in the intermediate layer database; acquiring changed data in the resources related to the infrastructure layer, and storing the data in the infrastructure layer database; and synchronizing the data in the infrastructure layer database to the intermediate layer database.

17 Claims, 4 Drawing Sheets

(56) References Cited

U.S. PATENT DOCUMENTS

| | | | | |
|---|---|---|---|---|
| 2013/0332505 A1* | 12/2013 | Karandikar | ......... | H04L 67/1002 709/202 |
| 2014/0143349 A1* | 5/2014 | Feser | ...................... | H04L 51/08 709/206 |
| 2015/0310188 A1* | 10/2015 | Ford | ....................... | G06F 21/10 726/28 |
| 2016/0048408 A1* | 2/2016 | Madhu | ................ | G06F 11/1458 718/1 |
| 2016/0070772 A1* | 3/2016 | Chatterjee | ........... | H04L 41/5041 707/639 |

* cited by examiner

METHOD AND APPARATUS FOR OPERATING INFRASTRUCTURE LAYER IN CLOUD COMPUTING ARCHITECTURE

CROSS-REFERENCE TO RELATED APPLICATION

This application claims the priority of Chinese Patent Application No. 201610739045.X, entitled "Method And Apparatus For Operating Infrastructure Layer In Cloud Computing Architecture," filed on Aug. 26, 2016, the content of which is incorporated herein by reference in its entirety.

TECHNICAL FIELD

The present disclosure relates to the field of computer technology, particularly to the technical field of cloud computing, and more particularly to a method and apparatus for operating an infrastructure layer in a cloud computing architecture.

BACKGROUND

IAAS (Infrastructure AS A Service) of cloud computing provides, via the Internet, elastic and on-demand data center, infrastructure hardware and software resources, as well as a console and API (Application Programming Interface) managing these resources. These elastic resources bring about enormous contributions and convenience to people's life and work and social development. However, the resource base layer (namely, the infrastructure layer) has many modules to implement, the distribution of service is extensive, interaction and communication mechanisms between modules are not uniform. Furthermore, the modules are dedicated to implement atomic functions, and the outward interface function is simplistic. Hence, this causes low performance and considerable difficulty in performing comprehensive management through the management console and API.

In reality, the user manages her own cloud resources by flexibly purchasing, looking-up, releasing and batch managing through the console or API provided by a cloud resource provider. Conventional art generally provides following schemes to implement cloud resource management: 1) not provide the management console and API, and the user directly logs in his own cloud resources for management; using this approach, the user needs to record his complete resource information, and operate one by one, resulting in considerable difficulty and low efficiency; 2) underlying service directly exposes an atomic interface, without concealing the underlying implementation details to the user, and lets the user himself combine various complicated service scenarios; and 3) management is performed with the help of a console, but the console directly interacts with the underlying services; this approach conceals the underlying implementation details, but is logically very complicated and extremely inefficient because the console needs to invoke a plurality of underlying services, and to process data of the plurality of underlying services.

SUMMARY

An object of the present disclosure provides a method and apparatus for operating an infrastructure layer of cloud computing architecture, to solve the technical problems mentioned in the Background.

In a first aspect, the present disclosure provides a method for operating an infrastructure layer of cloud computing architecture, the cloud computing architecture comprising an infrastructure layer providing computing and storage resources, and an intermediate layer providing multiple services on the basis of the resources provided by the infrastructure layer, the infrastructure layer comprising an infrastructure layer database, the intermediate layer comprising an intermediate layer database, the method comprising: determining, in response to receiving an operation request sent by a user via a user terminal for the infrastructure layer, whether to execute an operation indicated by the operation request; sending, in response to determining to execute the operation, the operation request to the infrastructure layer; updating, after the infrastructure layer successfully executing the operation and updating the resources related to the infrastructure layer, a state of the resources related to the infrastructure layer stored in the intermediate layer database; acquiring changed data in the resources related to the infrastructure layer, and storing the data in the infrastructure layer database; and synchronizing the data in the infrastructure layer database to the intermediate layer database.

In some embodiments, the determining whether to execute an operation indicated by the operation request comprises: determining whether the user has a right to operate the infrastructure layer; determining, in response to determining the user having the right to operate the infrastructure layer, whether a state of relevant resources in the infrastructure layer permits to execute the operation; confirming, in response to determining that the state of relevant resources in the infrastructure layer permits to execute the operation, to execute the operation.

In some embodiments, the operation request further comprises a maximum number of re-executions after the execution of the operation fails.

In some embodiments, after storing the data in the infrastructure layer database, the method further comprises: recording time of storing the data in the infrastructure layer database as update time.

In some embodiments, after synchronizing the data in the infrastructure layer database to the intermediate layer database, the method further comprises: recording time of synchronizing the data in the infrastructure layer database to the intermediate layer database as synchronization time.

In some embodiments, the synchronizing the data in the infrastructure layer database to the intermediate layer database comprises: synchronizing incremental data in the infrastructure layer database to the intermediate layer database according to pre-set increment synchronization time interval, wherein the incremental data is data in the infrastructure layer database that changed between the update time and the synchronization time.

In some embodiments, the synchronizing the data in the infrastructure layer database to the intermediate layer database comprises: synchronizing the data in the infrastructure layer database at regular time to the intermediate layer database according to a pre-set full synchronization time.

In a second aspect, the present disclosure provides an apparatus for operating an infrastructure layer of cloud computing architecture, the cloud computing architecture comprising an infrastructure layer providing computing and storage resources, and an intermediate layer providing multiple services on the basis of the resources provided by the infrastructure layer, the infrastructure layer comprising an infrastructure layer database, the intermediate layer comprising an intermediate layer database, the apparatus comprising: a determining unit configured to, determine, in response to receiving an operation request sent by a user via a user terminal for the infrastructure layer, whether to execute an operation indicated by the operation request; a transmitting unit configured to, send, in response to determining to execute the operation, the operation request to the infrastructure layer; an update unit configured to, update, after the infrastructure layer successfully executing the operation and updating the resources related to the infrastructure layer, a state of the resources related to the infrastructure layer stored in the intermediate layer database; a storage unit configured to acquire changed data in the resources related to the infrastructure layer, and storing the data in the infrastructure layer database; and a synchronization unit configured to synchronize the data in the infrastructure layer database to the intermediate layer database.

In some embodiments, the determining unit is further configured to: determine whether the user has a right to operate the infrastructure layer; in response to determining that the user has the right to operate the infrastructure layer, determine, in response to determining the user having the right to operate the infrastructure layer, whether a state of relevant resources in the infrastructure layer permits to execute the operation; confirm, in response to determining that the state of relevant resources in the infrastructure layer permits to execute the operation, to execute the operation.

In some embodiments, the operation request further comprises a maximum number of re-executions after the execution of the operation fails.

In some embodiments, the apparatus further comprises: an update time recording unit configured to record time of storing the data in the infrastructure layer database as update time, after the data is stored in the infrastructure layer database.

In some embodiments, the apparatus further comprises: a synchronization time recording unit configured to record time of synchronizing the data in the infrastructure layer database to the intermediate layer database as synchronization time, after the data in the infrastructure layer database is synchronized to the intermediate layer database.

In some embodiments, the synchronization unit is further configured to: synchronize incremental data in the infrastructure layer database to the intermediate layer database according to a pre-set increment synchronization time interval, wherein the incremental data is data in the infrastructure layer database that changed between the update time and the synchronization time.

In some embodiments, the synchronization unit is further configured to synchronize the data in the infrastructure layer database at regular time to the intermediate layer database according to a pre-set full synchronization time.

According to the method and apparatus for operating an infrastructure layer of cloud computing architecture according to the present disclosure, the resources of the infrastructure layer are operated through the console or API provided in the intermediate layer, and the data in the intermediate layer database is enabled synchronous with the data in the infrastructure layer database; when the operation such as query is executed, it is only necessary to access the intermediate layer database without interacting with the resources in the infrastructure layer; based on the intermediate layer and in a way of exchanging time with space, the present disclosure reduces implementation complexity of the infrastructure layer service and lessens the pressure of the infrastructure layer service so that the infrastructure layer service is more dedicated to implementation of atomic functions. As for the user, the present disclosure facilitates efficient purchase, lookup, release and management of the cloud resources, reduces time spent in managing the cloud resources, and improves the user's experience.

BRIEF DESCRIPTION OF THE DRAWINGS

Other features, objectives and advantages of the present disclosure will be made more apparent by reading through detailed description of unrestrictive embodiments with reference to the following figures.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
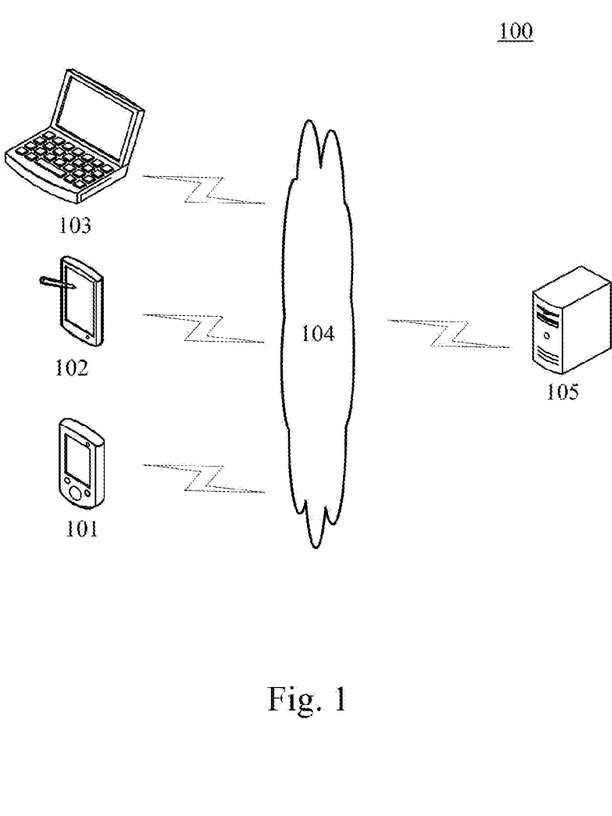
FIG. 1 is a diagram of an exemplary system architecture to which the present disclosure may be applied.

FIG. 1 shows an exemplary architecture of a system 100 which may be used by a method for operating an infrastructure layer of cloud computing architecture or an apparatus for operating an infrastructure layer of cloud computing architecture according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as cloud storage applications, shopping applications, search applications, instant messaging tools, mailbox clients, social platform software, etc. may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, e.g., a cloud server providing support for a client application running on the terminal equipment 101, 102, 103. The cloud server may perform processing such as analysis of received data such as an operation request for the infrastructure layer, and feed back a processing result (e.g., a query result) to the terminal equipment. It needs to be appreciated that the method for operating the infrastructure layer of cloud computing architecture provided by the embodiment of the present disclosure is generally executed by the server 105, and correspondingly, the apparatus for operating the infrastructure layer of cloud computing architecture is generally disposed in the server 105.

It should be appreciated that the number of the terminal equipment, network and server in FIG. 1 are only illustrative. There may be any number of terminal equipment, networks and servers according to needs in implementation.

Figure 2:
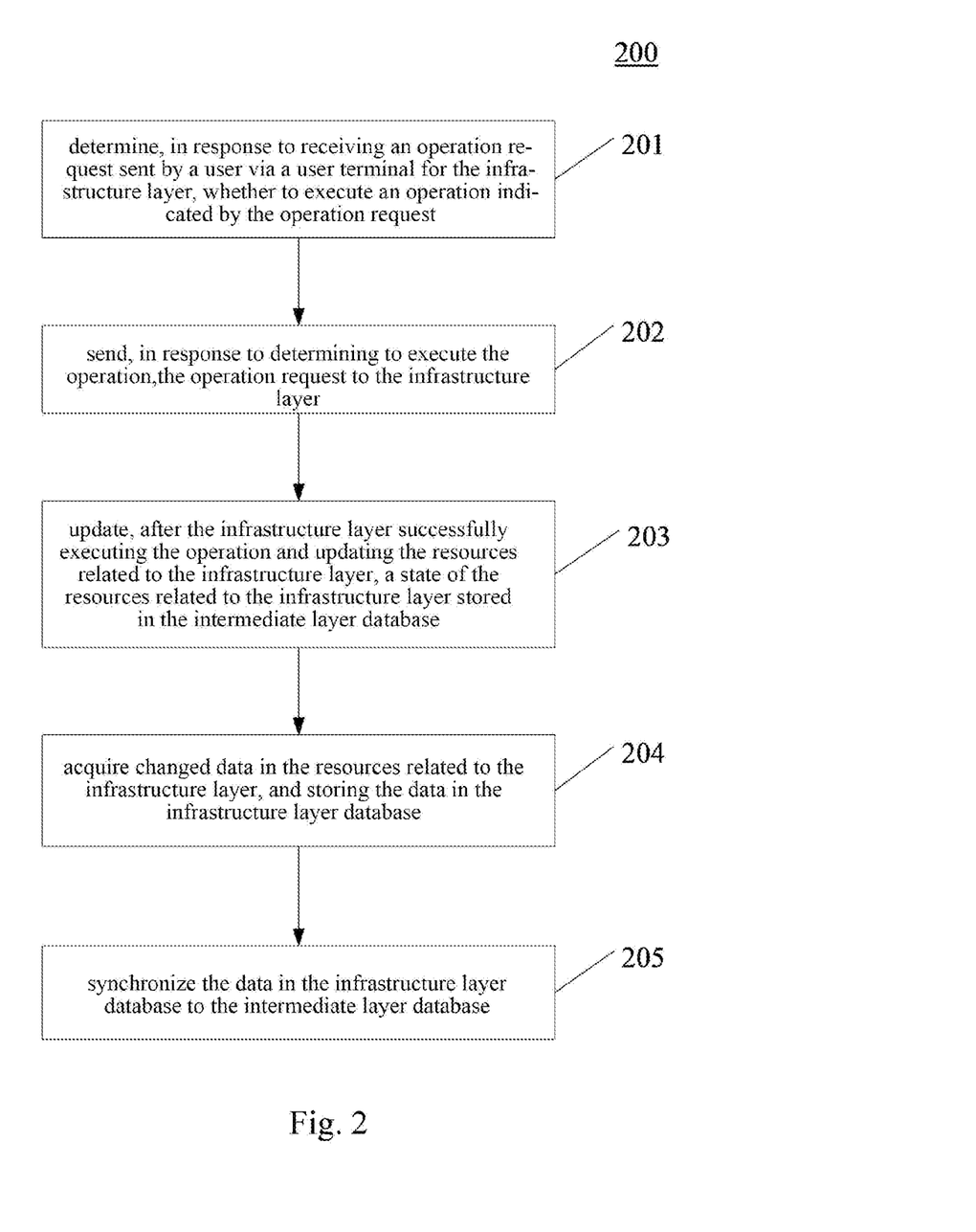
FIG. 2 is a flow chart of an embodiment of a method for operating an infrastructure layer of cloud computing architecture according to the present disclosure.

Turning to FIG. 2, FIG. 2 illustrates a flow chart 200 of an embodiment of a method for operating an infrastructure layer of cloud computing architecture according to the present disclosure. The method for operating an infrastructure layer of cloud computing architecture comprises the following steps:

Step 201: determining, in response to receiving an operation request sent by a user via a user terminal for the infrastructure layer, whether to execute an operation indicated by the operation request.

Cloud computing architecture comprises three layers: an application layer, an intermediate layer and an infrastructure layer. The application layer, with a friendly user interface, provides the user with desired various application software and services, the application layer directly faces the client demands, and provides enterprise clients with enterprise applications such as CRM (Customer Relationship Management), ERP (Enterprise Resource Planning) and OA (Office Automation). The intermediate layer is an in-between layer and provides, on the basis of the resources provided by the infrastructure layer, the user with services, including access control, resource management, database and middleware clustering, and meanwhile may provide the user with a customized development interface by integrating API. The infrastructure layer provides the intermediate layer or user with desired computing and storage resources, and pools resources through technologies such as virtualization to implement on-demand allocation and quick deployment of resources.

In the present embodiment, according to the method for operating an infrastructure layer of cloud computing architecture, an electronic device (e.g., the server as shown in FIG. 1) running thereon may, in a wired connection approach or a wireless connection approach, receives from the user the user's operation request for the infrastructure layer by using his user terminal performing cloud resource management, to determine whether to execute an operation indicated by the operation request. The intermediate layer of the cloud server executes the step of determining whether to execute an operation indicated by the operation request, a state of the resources of the infrastructure layer is stored in the database of the intermediate layer, the state of the resources of the infrastructure layer may be judged by querying to the database of the intermediate layer, needless to interact with the infrastructure layer. For example, when the user, through the console or API provided by the intermediate layer, performs restart operation for a virtual machine, the intermediate layer first judges whether the restart operation can be executed after receiving the restart operation instruction.

In some optional implementations of the present embodiment, the determining whether to execute an operation indicated by the operation request comprises: determining whether the user has a right to operate the infrastructure layer; determining, in response to determining the user having the right to operate the infrastructure layer, whether a state of relevant resources in the infrastructure layer permits to execute the operation; confirming, in response to determining that the state of relevant resources in the infrastructure layer permits to execute the operation, to execute the operation. For example, when the user sends a command to restart the virtual machine, first judge whether the user has an administrator right. If the user is only an ordinary user, he does not have the right to restart the virtual machine. A user having the right to restart the virtual machine executes the restart operation. Before executing the operation, query for whether a current state of the virtual machine stored in the database of the intermediate layer permits to execute the restart operation. When unpermitted operation is found, the intermediate layer may directly encapsulate prompt information and return it to the user to display this information on the user terminal.

In some optional implementations of the present embodiment, the operation request further comprises a maximum number of re-executions after the execution of the operation fails. To increase an opportunity of successful operation, if overtime occurs, retry is performed. The maximum number of retries may be set as three times. If success is still not achieved after re-execution is performed to the maximum number, the intermediate layer encapsulates prompt information and return it to the user to display this information on the user terminal, and terminate subsequent operations.

Step 202: sending, in response to determining to execute the operation, the operation request to the infrastructure layer.

In the present embodiment, after determining that the operation may be executed, the intermediate layer sends the operation request to the infrastructure layer. For example, send the request to the infrastructure layer to restart an interface of the virtual machine and complete the restart operation of the virtual machine.

Step 203: updating, after the infrastructure layer successfully executing the operation and updating the resources related to the infrastructure layer, a state of the resources related to the infrastructure layer stored in the intermediate layer database.

In the present embodiment, the infrastructure layer, after successfully executing the operation, updates the infrastructure layer-related resources, and then notifies the intermediate layer to synchronously update the state of the infrastructure layer-related resources stored in the database of the intermediate layer so that the state of the infrastructure layer-related resources stored in the intermediate layer is consistent with the actual state of the infrastructure layer-related resources. For example, after the virtual machine is restarted, a physical memory resource state of the CPU originally occupied by the virtual machine changes, the intermediate layer is notified to synchronously update the state of these resources, the virtual machine is identified as restart, and meanwhile a message that the virtual machine in the process of restart is returned to the user.

Step 204: acquiring changed data in the resources related to the infrastructure layer, and storing the data in the infrastructure layer database.

In the present embodiment, the cloud server stores data of the change occurring with the infrastructure layer-related resources in the database of the infrastructure layer. For example, after the virtual machine is restarted, released memory resource data is stored in the infrastructure layer database. A principle "update in the event of existence" is employed, i.e., if the object information has already existed, time of data change and a latest state of data are only updated to ensure each virtual machine or object only has one record, and thereby reduce the amount of data to be read upon data synchronization of each time and improve synchronization efficiency.

Step 205: synchronizing the data in the infrastructure layer database to the intermediate layer database.

In the present embodiment, the data in the infrastructure layer database is synchronized to the intermediate layer database to ensure consistence of the infrastructure layer database and the data of the intermediate layer database. In order to ensure sufficient small time of delay of the change of data state, the intermediate layer data synchronization service creates a corresponding thread for each type of resource, and creates a corresponding thread for an operation that does not pass a uniform resource portion, to minimize the user's waiting time.

In some optional implementations of the present embodiment, the data in the infrastructure layer database is synchronized at regular time to the intermediate layer database according to a pre-set full synchronization time. For example, the pre-set full synchronization time is 6:00 am, and the data in the infrastructure layer database is synchronized to the intermediate layer database at 6:00 am every day. Furthermore, it is feasible to detect consistency of data in the two databases. If inconsistency occurs, an alarm may be sent according to pre-set alarming conditions.

The method provided by the embodiment of the present disclosure, based on the intermediate layer and in a way of exchanging time with space, saves time consumed in purchasing, looking up, releasing and managing cloud resource, reduces implementation complexity of the infrastructure layer service and lessens the pressure of the infrastructure layer service.

Figure 3:
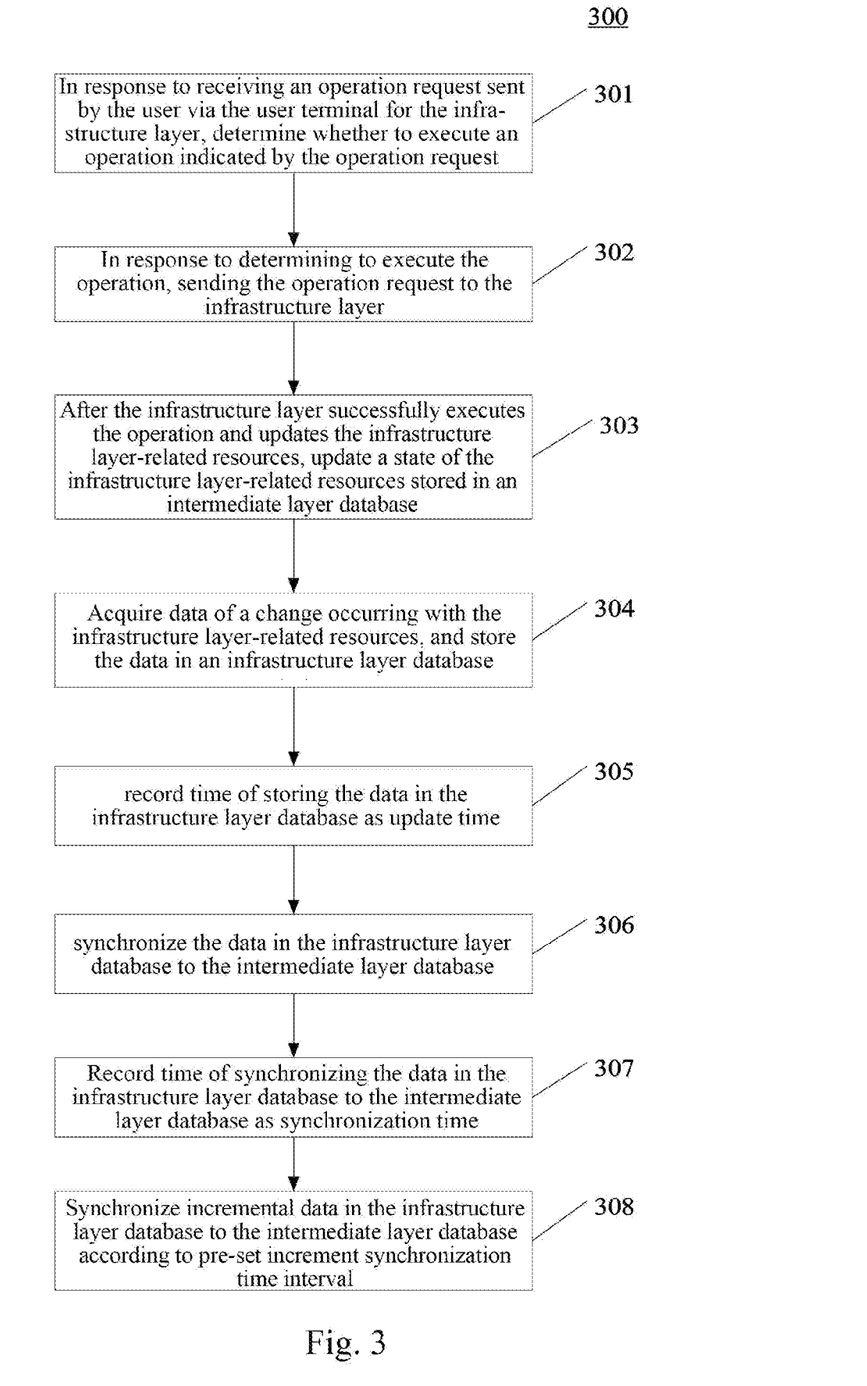
FIG. 3 is a flow chart of a further embodiment of a method for operating an infrastructure layer of cloud computing architecture according to the present disclosure.

Then referring to FIG. 3, FIG. 3 illustrates a flow chart 300 of a further embodiment of a method for operating an infrastructure layer of cloud computing architecture according to the present disclosure. The method for operating an infrastructure layer of cloud computing architecture comprises the following steps:

Step 301: determining, in response to receiving an operation request sent by a user via a user terminal for the infrastructure layer, whether to execute an operation indicated by the operation request.

Step 302: sending, in response to determining to execute the operation, the operation request to the infrastructure layer.

Step 303: updating, after the infrastructure layer successfully executing the operation and updating the resources related to the infrastructure layer, a state of the resources related to the infrastructure layer stored in the intermediate layer database.

Step 304: acquiring changed data in the resources related to the infrastructure layer, and storing the data in the infrastructure layer database.

Steps 301-304 are substantially identical with steps 201-204 and will not be detailed any more here.

Step 305: recording time of storing the data in the infrastructure layer database as update time.

In the present embodiment, after the data is stored in the database of the infrastructure layer, the storage time is recorded as the update time for subsequently judging whether the intermediate layer database needs to be synchronized.

Step 306: synchronizing the data in the infrastructure layer database to the intermediate layer database.

Step 306 is substantially identical with step 205 and therefore is not detailed any more here.

Step 307: recording time of synchronizing the data in the infrastructure layer database to the intermediate layer database as synchronization time.

In the present embodiment, after the data in the infrastructure layer database is synchronized to the intermediate layer database each time, the synchronization time is recorded as a basis for judging whether to synchronize next time.

Step 308: synchronizing incremental data in the infrastructure layer database to the intermediate layer database according to a pre-set increment synchronization time interval.

In the present embodiment, the increment synchronization time interval may be pre-set, for example, 15 minutes, and the incremental data in the infrastructure layer database is synchronized to the intermediate layer database every 15 minutes, wherein the incremental data is data that changes happen to the infrastructure layer database between the steps of recording the update time and synchronization time. For example, if the time of synchronization of the intermediate layer database last time is 8:30, and the update time of the infrastructure layer database is 8:40, the incremental data is synchronized at 8:45. If the update time of the infrastructure layer database is still 8:30, the incremental data is not synchronized at 8:45. When increment synchronization is performed, the increment synchronization is executed every time when the increment synchronization moment comes no matter previous synchronization has been completed.

In some optional implementations of the present embodiment, it is further feasible to set different synchronization time intervals for the data as per categories, e.g., set a fixed time interval of 0.5 s for order-like operations (newly-creating/changing configurations/renewing payment of fees) and non-order-like operations (restart/snapshot/mirror etc.) for synchronization. After synchronization is completed every time, synchronization is executed repeatedly after an interval of 0.5 s. Different threads may be created for different types of synchronization approaches to achieve maximum throughput and minimum synchronous delay. It is also feasible to employ manual synchronization to solve the problem that few data are found inconsistent.

As can be seen from FIG. 3, as compared with the embodiment corresponding to FIG. 2, the flow chart 300 of the method for operating an infrastructure layer of cloud computing architecture in the present embodiment highlights the procedure of synchronizing the incremental data, as advantageous complementation for whole quality synchronization, and may reduce the amount of data to be read upon data synchronization every time and improve synchronization efficiency.

Figure 4:
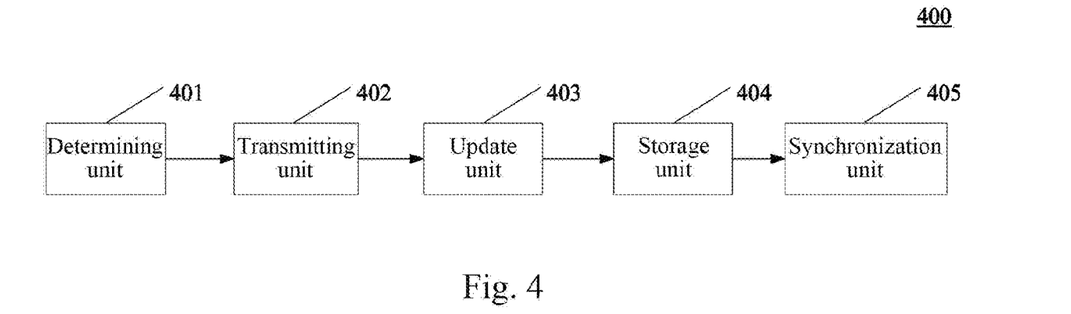
FIG. 4 is a structural schematic view of an embodiment of an apparatus for operating an infrastructure layer of cloud computing architecture according to the present disclosure.

Further referring to FIG. 4, as implementation of the method shown in the above figures, the present disclosure provides an embodiment of an apparatus for operating an infrastructure layer of cloud computing architecture. The apparatus embodiment corresponds to the method embodiment shown in FIG. 2. The apparatus may be specifically applied to various electronic devices.

As shown in FIG. 4, the apparatus 400 for operating an infrastructure layer of cloud computing architecture according to the present embodiment comprises: a determining unit 401, a transmitting unit 402, an update unit 403, a storage unit 404 and a synchronization unit 405, wherein the determining unit 401 is configured to, in response to receiving an operation request sent by the user via the user terminal for the infrastructure layer, determine whether to execute an operation indicated by the operation request; the transmitting unit 402 is configured to, in response to determining to execute the operation, send an operation request to the infrastructure layer; the update unit 403 is configured to, after the infrastructure layer successfully executes the operation and updates the infrastructure layer-related resources, update a state of the infrastructure layer-related resources stored in an intermediate layer database; the storage unit 404 is configured to acquire data of a change occurring with the infrastructure layer-related resources, and store the data in an infrastructure layer database; and the synchronization unit 405 is configured to synchronize data in the infrastructure layer database to the intermediate layer database.

In the present embodiment, the determining unit 401 in the intermediate layer of cloud computing confirms the operation request of the infrastructure layer and then the transmitting unit 402 transmits it to the infrastructure layer. After the infrastructure layer completes the execution, the update unit 403 updates a state of resources stored in the intermediate layer, then the storage unit 404 stores the data of changes, and finally the data in the infrastructure layer database is synchronized to in the intermediate layer database.

In some optional implementations of the present embodiment, the determining unit 401 is further configured to determine whether the user has a right to operate the infrastructure layer; in response to determining that the user has the right to operate the infrastructure layer, determine whether a state of relevant resources of the infrastructure layer permits to execute the operation; in response to determining that the state of relevant resources of the infrastructure layer permits to execute the operation, confirming to execute the operation.

In some optional implementations of the present embodiment, the operation request further comprises maximum times of re-execution after the execution of the operation fails.

In some optional implementations of the present embodiment, the apparatus 400 further comprises: an update time recording unit (not shown) configured to record time of storing the data in the infrastructure layer database as update time, after the data is stored in the infrastructure layer database.

In some optional implementations of the present embodiment, the apparatus 400 further comprises: a synchronization time recording unit (not shown) configured to record time of synchronizing the data in the infrastructure layer database to the intermediate layer database as synchronization time, after the data in the infrastructure layer database is synchronized to the intermediate layer database.

In some optional implementations of the present embodiment, the synchronization unit 405 is further configured to synchronize incremental data in the infrastructure layer database to the intermediate layer database according to pre-set increment synchronization time interval, wherein the incremental data is data that changes happen to the infrastructure layer database between the update time and synchronization time.

In some optional implementations of the present embodiment, the synchronization unit 405 is further configured to synchronize the data in the infrastructure layer database at regular time to the intermediate layer database according to a pre-set full synchronization time.

Figure 5:
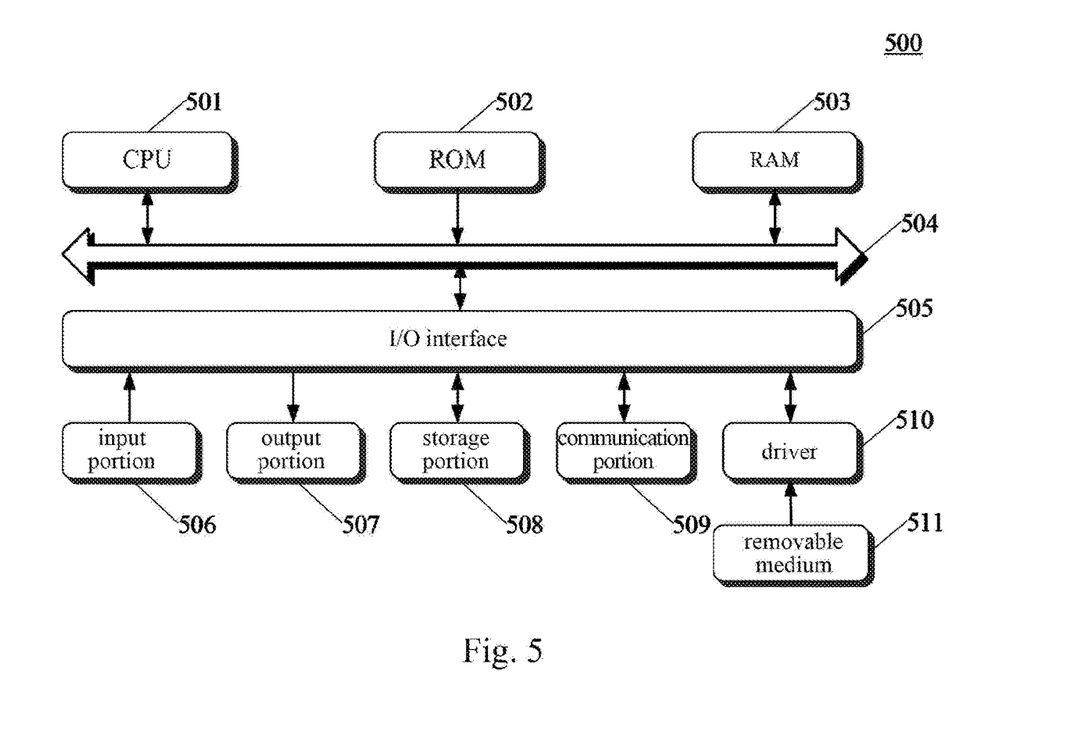
FIG. 5 is a structural schematic diagram of a terminal equipment or a computer system of a server adapted to implement the embodiment of the present disclosure.

Referring to FIG. 5, a schematic structural diagram of a computer system 500 adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquiring unit, a downloading unit, a receiving unit, a parsing unit and a processing unit, where the names of these units or modules are not considered as a limitation to the units or modules. For example, the acquiring unit may also be described as "a unit for acquiring a slave station data reading rule table configured in a cloud by a user."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire to-be-transmitted information; determine a network relationship between a current node and an information receiving node receiving the to-be-transmitted information, the network relationship comprising a remote relationship and a local relationship; determine a transmission approach of the to-be-transmitted information based on a message transmission parameter, a configuration parameter and the network relationship, wherein the transmission approach is at least one of the following: a network interface transmission approach and a local shared memory transmission approach; the message transmission parameter is determined by a node manager in the robot operating system based on the network relationship, and the configuration parameter is determined by the node manager of the robot operating system according to the message transmission parameter to set information storage area for the corresponding transmission approach; transmit the to-be-transmitted information using the transmission approach.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for operating an infrastructure layer in a cloud computing architecture, the cloud computing architecture comprising an infrastructure layer providing computing and storage resources, and an intermediate layer providing multiple services on the basis of the resources provided by the infrastructure layer, the infrastructure layer being accessible by a user terminal through the intermediate layer, the infrastructure layer comprising an infrastructure layer database, the intermediate layer comprising an intermediate layer database, the method comprising:
   determining, in response to receiving an operation request sent by a user via the user terminal for the infrastructure layer, whether to execute an operation indicated by the operation request, comprising:
      (i) determining whether the user has a right to operate the infrastructure layer;
      (ii) determining, in response to determining the user having the right to operate the infrastructure layer, whether a state of relevant resources in the infrastructure layer permits to execute the operation; and
      (iii) confirming, in response to determining that the state of relevant resources in the infrastructure layer permits to execute the operation, to execute the operation;
   sending, in response to determining to execute the operation, the operation request to the infrastructure layer;
   updating, after the infrastructure layer successfully executing the operation and updating the resources related to the infrastructure layer, a state of the resources related to the infrastructure layer stored in the intermediate layer database, the intermediate layer database being accessible by the user terminal through the intermediate layer;
   acquiring changed data in the resources related to the infrastructure layer, and storing the data in the infrastructure layer database, the infrastructure layer database storing a record of a virtual machine, wherein by accessing the infrastructure layer through the intermediate layer, the user terminal is accessible to the infrastructure layer database;
   synchronizing the data in the infrastructure layer database to the intermediate layer database at regular intervals, wherein different categories of data are synchronized at different intervals.

2. The method for operating an infrastructure layer of cloud computing architecture according to claim 1, wherein the operation request comprises a maximum number of re-executions after the execution of the operation fails.

3. The method for operating an infrastructure layer of cloud computing architecture according to claim 1, wherein after storing the data in the infrastructure layer database, the method further comprises:
   recording time of storing the data in the infrastructure layer database as update time.

4. The method for operating an infrastructure layer of cloud computing architecture according to claim 3, wherein after synchronizing the data in the infrastructure layer database to the intermediate layer database, the method further comprises:
   recording time of synchronizing the data in the infrastructure layer database to the intermediate layer database as synchronization time.

5. The method for operating an infrastructure layer of cloud computing architecture according to claim 4, wherein the synchronizing the data in the infrastructure layer database to the intermediate layer database comprises:
   synchronizing incremental data in the infrastructure layer database to the intermediate layer database according to a pre-set increment synchronization time interval, wherein the incremental data is data in the infrastructure layer database that changed between the update time and the synchronization time.

6. The method for operating an infrastructure layer of cloud computing architecture according to claim 1, wherein the synchronizing the data in the infrastructure layer database to the intermediate layer database comprises:
   synchronizing the data in the infrastructure layer database at regular time to the intermediate layer database according to a pre-set full synchronization time.

7. The method for operating an infrastructure layer of cloud computing architecture according to claim 1, wherein the categories of data comprise an order-like operation, and a non-order-like operation.

8. The method for operating an infrastructure layer of cloud computing architecture according to claim 1, the changed data comprising time of data change.

9. An apparatus for operating an infrastructure layer of cloud computing architecture, the cloud computing architecture comprising an infrastructure layer providing computing and storage resources, and an intermediate layer providing multiple services on the basis of the resources provided by the infrastructure layer, the infrastructure layer being accessible by a user terminal through the intermediate layer, the infrastructure layer comprising an infrastructure layer database, the intermediate layer comprising an intermediate layer database, the apparatus comprising:
  at least one processor; and
  a memory storing instructions, which when executed by the at least one processor, cause the at least one processor to perform operations, the operations comprising:
  determining, in response to receiving an operation request sent by a user via a the user terminal for the infrastructure layer, whether to execute an operation indicated by the operation request, comprising:
    (i) determining whether the user has a right to operate the infrastructure layer;
    (ii) determining, in response to determining the user having the right to operate the infrastructure layer, whether a state of relevant resources in the infrastructure layer permits to execute the operation; and
    (iii) confirming, in response to determining that the state of relevant resources in the infrastructure layer permits to execute the operation, to execute the operation;
  sending, in response to determining to execute the operation, the operation request to the infrastructure layer;
  updating, after the infrastructure layer successfully executing the operation and updating the resources related to the infrastructure layer, a state of the resources related to the infrastructure layer stored in the intermediate layer database, the intermediate layer database being accessible by the user terminal through the intermediate layer;
  acquiring changed data in the resources related to the infrastructure layer, and storing the data in the infrastructure layer database, the infrastructure layer database storing a record of a virtual machine, wherein by accessing the infrastructure layer through the intermediate layer, the user terminal is accessible to the infrastructure layer database; and
  synchronizing the data in the infrastructure layer database to the intermediate layer database at regular intervals, wherein different categories of data are synchronized at different intervals.

10. The apparatus for operating an infrastructure layer of cloud computing architecture according to claim 9, wherein the operation request further comprises a maximum number of re-executions after the execution of the operation fails.

11. The apparatus for operating an infrastructure layer of cloud computing architecture according to claim 9, the operations further comprising:
  recording time of storing the data in the infrastructure layer database as update time, after the data is stored in the infrastructure layer database.

12. The apparatus for operating an infrastructure layer of cloud computing architecture according to claim 11, the operations further comprising:
  recording time of synchronizing the data in the infrastructure layer database to the intermediate layer database as synchronization time, after the data in the infrastructure layer database is synchronized to the intermediate layer database.

13. The apparatus for operating an infrastructure layer of cloud computing architecture according to claim 12, the synchronizing the data in the infrastructure layer database to the intermediate layer database further comprising:
  synchronizing incremental data in the infrastructure layer database to the intermediate layer database according to a pre-set increment synchronization time interval, wherein the incremental data is data in the infrastructure layer database that changed between the update time and the synchronization time.

14. The apparatus for operating an infrastructure layer of cloud computing architecture according to claim 9, the synchronizing the data in the infrastructure layer database to the intermediate layer database further comprising:
  synchronizing the data in the infrastructure layer database to the intermediate layer database according to a pre-set full synchronization time.

15. A non-transitory computer storage medium storing a computer program, which when executed by one or more processors, cause the one or more processors to perform operations for operating an infrastructure layer in a cloud computing architecture, the cloud computing architecture comprising an infrastructure layer providing computing and storage resources, and an intermediate layer providing multiple services on the basis of the resources provided by the infrastructure layer, the infrastructure layer being accessible by a user terminal through the intermediate layer, the infrastructure layer comprising an infrastructure layer database, the intermediate layer comprising an intermediate layer database, the operations comprising:
  determining, in response to receiving an operation request sent by a user via a the user terminal for the infrastructure layer, whether to execute an operation indicated by the operation request comprising:
    (i) determining whether the user has a right to operate the infrastructure layer;
    (ii) determining, in response to determining the user having the right to operate the infrastructure layer, whether a state of relevant resources in the infrastructure layer permits to execute the operation; and
    (iii) confirming, in response to determining that the state of relevant resources in the infrastructure layer permits to execute the operation, to execute the operation;
  sending, in response to determining to execute the operation, the operation request to the infrastructure layer;
  updating, after the infrastructure layer successfully executing the operation and updating the resources related to the infrastructure layer, a state of the resources related to the infrastructure layer stored in the intermediate layer database, the intermediate layer database being accessible by the user terminal through the intermediate layer;
  acquiring changed data in the resources related to the infrastructure layer, and storing the data in the infrastructure layer database, the infrastructure layer database storing a record of a virtual machine, wherein by accessing the infrastructure layer through the intermediate layer, the user terminal is accessible to the infrastructure layer database; and synchronizing the data in the infrastructure layer database to the intermediate layer database at regular intervals, wherein different categories of data are synchronized at different intervals.

16. The non-transitory computer storage medium according to claim 15, wherein the operation request further comprises a maximum number of re-executions after the execution of the operation fails.

17. The non-transitory computer storage medium according to claim 15, wherein the operation further comprises:

recording time of storing the data in the infrastructure layer database as update time, after the data is stored in the infrastructure layer database.

* * * * *